United States Patent
Frye

(10) Patent No.: US 9,179,410 B2
(45) Date of Patent: Nov. 3, 2015

(54) OWNER SELECTABLE AND CONTEXT ADJUSTABLE DRX TIMING

(71) Applicant: General Motors LLC, Detroit, MI (US)

(72) Inventor: Mark S. Frye, Gross Pointe Woods, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 217 days.

(21) Appl. No.: 13/674,571

(22) Filed: Nov. 12, 2012

(65) Prior Publication Data

US 2014/0133374 A1     May 15, 2014

(51) Int. Cl.
*H04W 52/02*     (2009.01)
(52) U.S. Cl.
CPC .................................. *H04W 52/0251* (2013.01)
(58) Field of Classification Search
CPC ....................... H04W 52/0225; H04W 52/0251
See application file for complete search history.

(56) References Cited

U.S. PATENT DOCUMENTS

| | | | |
|---|---|---|---|
| 2010/0165899 A1* | 7/2010 | Van Bosch et al. | 370/311 |
| 2012/0140688 A1* | 6/2012 | Hering et al. | 370/311 |
| 2013/0016637 A1* | 1/2013 | Yi et al. | 370/311 |
| 2014/0099970 A1* | 4/2014 | Siomina et al. | 455/456.1 |

* cited by examiner

*Primary Examiner* — Jianye Wu
(74) *Attorney, Agent, or Firm* — Leydig, Voit & Mayer, Ltd.

(57) ABSTRACT

A method is provided for user customization and context-based adjustment of a discontinuous reception (DRx) schedule for a telematics-equipped vehicle. The method includes receiving, by a telematics unit of the vehicle, user input of DRx schedule information; determining, by the telematics unit, that ignition of the vehicle has been switched off; determining, by the telematics unit, an applicable DRx schedule from a plurality of DRx schedules, wherein the plurality of DRx schedules are based on the user input DRx schedule information; and executing, by the telematics unit, the applicable DRx schedule. The method further includes adjustment of the applicable DRx schedule based on a contextual parameter.

16 Claims, 4 Drawing Sheets

OWNER SELECTABLE AND CONTEXT ADJUSTABLE DRX TIMING

FIELD

The present disclosure relates generally to telematics systems and more particularly to customization and adjustment of the timing of standby periods and/or discontinuous receive (DRx) cycles for telematics units.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Upon activation, the telematics unit can be utilized to provide a subscriber with telematics services such as those described herein.

When the ignition of the mobile vehicle is off, the vehicle is placed into a powered-down discontinuous-reception (DRx) or standby state (also called a sleep cycle). Vehicle hardware, such as a telematics unit, may be placed into the standby state or DRx cycle to minimize power drain on the vehicle battery. Even while vehicle hardware is in the standby state or DRx cycle, a network access device (NAD) of the vehicle may consume power while searching for signal or waiting for a command, draining the vehicle's battery.

During standby, the NAD is active and able to receive wireless communications. DRx cycles include both time where the NAD is off and unable to receive wireless communications, as well as time where the NAD is on and able to receive commands wirelessly. During standby and DRx periods, service requests—such as maintenance and diagnostic functions, system updates, vehicle position determination, unlocking of the doors, or vehicle alarm silencing—may be sent to the telematics unit when the NAD is on, and the telematics unit causes appropriate vehicle hardware to be turned on to perform the requested service. DRx cycles consume power, and after a certain amount of time, the vehicle may end the DRx period and switch to an off mode. After being switched to an off mode, the vehicle hardware becomes unavailable for communication.

Conventionally, vehicles are assigned a predetermined standby and DRx schedule that they follow each time the vehicle ignition is shut off, with the vehicles eventually being completely switched to an off mode after the DRx cycles are complete. However, such predetermined DRx schedules do not account for the variability of user behavior and the needs of particular users at particular times.

The above body of information is provided for the convenience of the reader. The foregoing describes a suitable environment for which the described system and method are provided, and is not an attempt to review or catalog the prior art.

SUMMARY

Systems and methods are described herein for user customization and context-based adjustment of a discontinuous reception (DRx) schedule for a telematics-equipped vehicle. In an implementation, the method includes: receiving, by a telematics unit of the vehicle, user input of DRx schedule information; determining, by the telematics unit, that ignition of the vehicle has been switched off; determining, by the telematics unit, an applicable DRx schedule from a plurality of DRx schedules, wherein the plurality of DRx schedules are based on the user input DRx schedule information; and executing, by the telematics unit, the applicable DRx schedule.

In another implementation, the method includes: determining, by the telematics unit, that ignition of the vehicle has been switched off; determining, by the telematics unit, contextual parameters; determining, by the telematics unit, a DRx schedule based on the contextual parameters; and executing, by the telematics unit, the DRx schedule.

In a further implementation, the present invention is implemented as computer-executable instructions stored on a tangible, non-transitory computer-readable medium that is part of a telematics unit.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Before discussing the details of the invention and the environment wherein the invention may be used, a brief overview is given to guide the reader. In general terms, not intended to limit the claims, systems and methods are described herein for allowing users to customize the standby and DRx schedules executed by telematics-equipped vehicles when the vehicles are powered down, as well as providing context-adjustable DRx scheduling.

Figure 1:
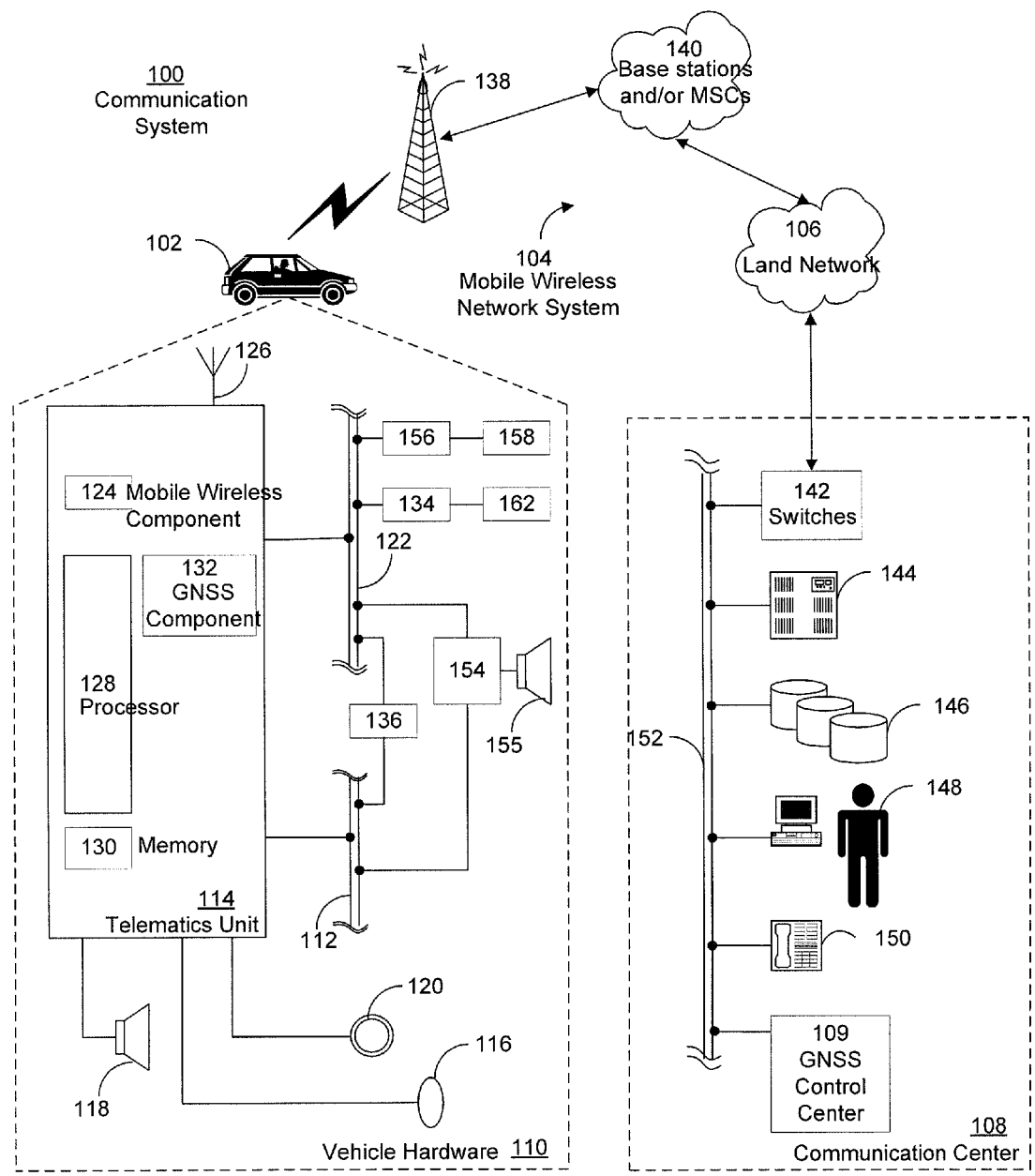
FIG. 1 is a schematic diagram of an operating environment for a mobile vehicle communication system usable in implementations of the described principles.

An exemplary computing and network communications environment is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a mobile wireless network system 104, a land network 106 and a communications center 108. It should be appreciated that the overall architecture, setup and operation, as well as the individual components of the communication system 100 is generally known in the art. In accordance with an illustrative example, the communication center 108 includes a GNSS control center 109 incorporating functional components facilitating over-the-air configuration of GNSS receivers integrated with/within telematics units such as a telematics unit 114. Thus, the following paragraphs provide a brief overview of an exemplary communication system 100. However, other systems are contemplated that are capable of incorporating the described GNSS receiver and GNSS control center functionality described herein.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, the telematics unit 114, a microphone 116, a speaker 118 and buttons and/or controls 120 integrated with the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108. The telematics unit 114 includes an electronic processor 128, electronic memory 130, a mobile wireless component 124 including a mobile wireless chipset, a dual function antenna 126 (both GNSS and mobile wireless signal), and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114.

The telematics unit 114 provides, for users, an extensive/extensible set of services. Examples of such services include: GNSS-based mapping location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art.

The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

Vehicle communications use radio transmissions to establish a communications channel with the mobile wireless network system 104 so that both voice and data signals can be sent and received via the communications channel. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component.

The microphone 116 provides the driver or other vehicle occupant with a means for inputting verbal or other auditory commands, and can be equipped with an embedded voice processing unit utilizing a human/machine interface (HMI) technology known in the art. The speaker 118 provides verbal output to the vehicle occupants and can be either a stand-alone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control.

The mobile wireless network system 104 is, for example, a cellular telephone network system or any other suitable wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. For example, the MSC 140 includes a remote data server.

As appreciated by those skilled in the art, the mobile wireless network system includes various cell tower/base station/MSC arrangements. For example, abuse station and a cell tower could be co-located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (P) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The communications center 108 is configured to provide a variety of back-end services and application functionality to the hardware 110. The communications center 108 includes, by way of example, network switches 142, servers 144, databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center.

Figure 2:
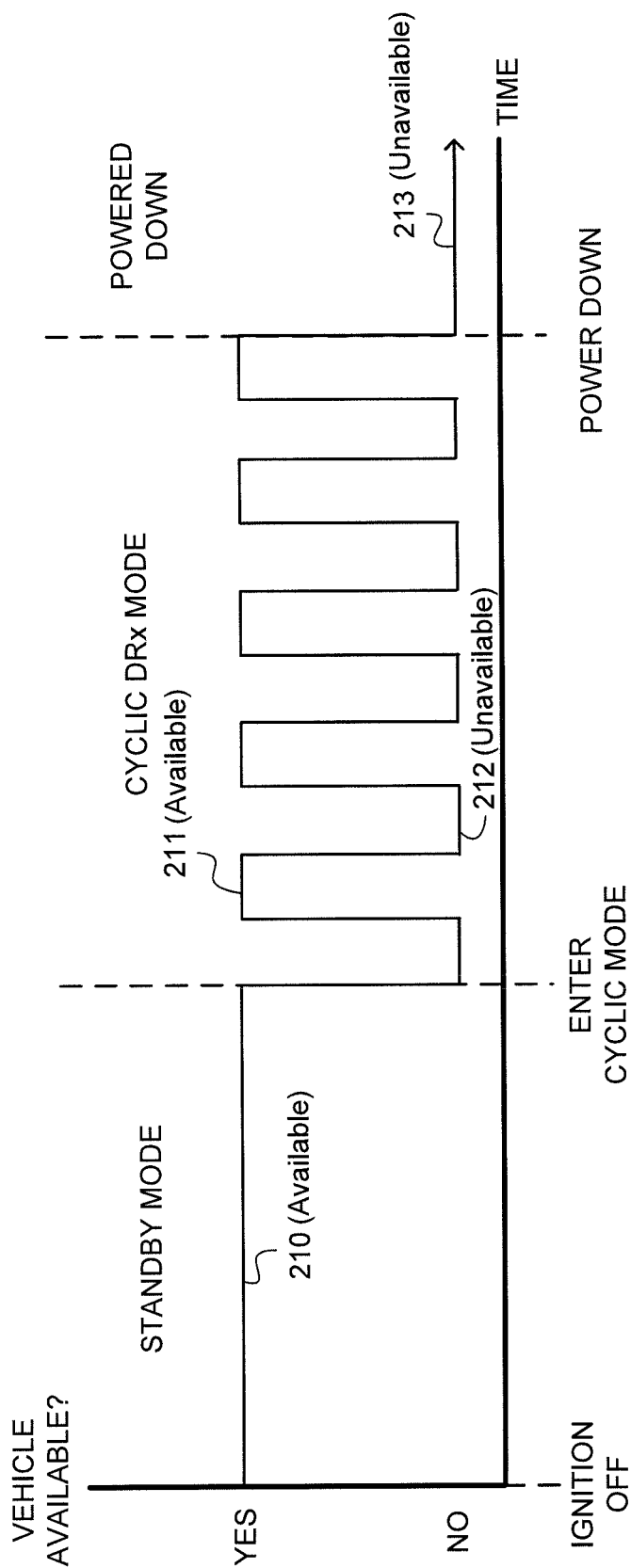
FIG. 2 is a diagram showing the exemplary operation of a vehicle in different modes when vehicle ignition is turned off.

With further reference to the architecture of FIG. 1, and turning more specifically to FIG. 2, a diagram 200 is shown that illustrates a DRx schedule and the operation of the DRx timer in an exemplary implementation. After a vehicle's ignition is turned off, the vehicle enters a standby mode 210 for, e.g., two hours where the communications sent over the wireless network 104 to the vehicle 102 are readily received and processed (i.e. the vehicle is available to receive communications). After two hours of standby mode, the vehicle may enter into a cyclic DRx mode, and the vehicle cycles between being available 211 and unavailable 212. The vehicle may remain available 211, e.g., for ten minutes at a time, and then become unavailable 212 for the next ten minutes, repeating the cycle until, e.g., five hours have passed and the vehicle enters the powered down state 213. The vehicle 102 then remains in the powered down state 213 indefinitely, until the vehicle ignition is turned back on or some other event occurs. It will be appreciated that, at any time during this DRx schedule, if the vehicle ignition is turned back on, the vehicle will break from the DRx schedule and enter an "awake" state independent from the DRx schedule, and the DRx schedule will start over from the beginning the next time the vehicle ignition is turned off.

It will also be appreciated that all the specific times described herein are merely exemplary, and any amount of time may be designated for the standby mode, the length of the cycles in cyclic mode (which do not have to be the same from cycle to cycle), and the amount of time after which the vehicle powers down. For example, the vehicle could go through a standby mode that lasts for 12 hours in another embodiment, enter a cyclic mode with cycles of 15 minutes available and 20 minutes unavailable, and then power down after 12 hours of operating in cyclic DRx mode. In another example, the vehicle could go straight into the cyclic DRx mode upon the vehicle ignition being shut off, and then power down completely after the cyclic DRx mode is complete (thereby omitting any standby period).

Figure 3:
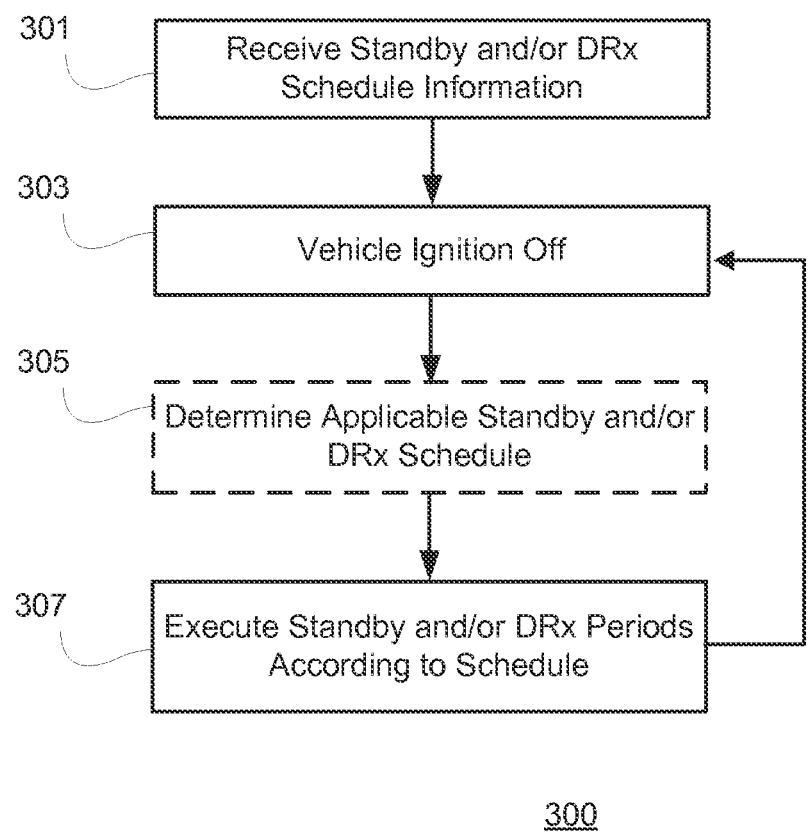
FIG. 3 is a flowchart illustrating an exemplary process for executing a user-selectable standby and/or DRx schedule according to an implementation.

Implementations of the present invention recognize that different users have different needs with respect to wirelessly communicating with their telematics-equipped vehicles, and even a single user may have different usage needs at different times or in different situations. Thus, implementations of the present invention provide a process, such as the process 300 illustrated in FIG. 3, for allowing users to customize and select the manner in which a telematics-equipped vehicle executes a standby and/or DRx schedule.

At stage 301, the user inputs standby and/or DRx schedule information, which is received by the telematics unit. It will be appreciated that the input of standby and/or DRx schedule information may take place, for example, using an HMI within the vehicle, may be done on a personal computer or mobile device and then be communicated to the telematics unit, or may be done through a communication session with a TSP call center where the call center programs the user's preferences into the telematics unit. Regardless of input method, the telematics unit receives Standby and/or DRx schedule information that is customized by the user.

The standby and/or DRx schedule information may take a variety of forms. In one exemplary implementation, the user can specifically indicate particular lengths of time for the standby and/or DRx periods. The user can further specifically indicate different situations at which to apply certain lengths of standby and/or DRx periods. For example, the user may expect that communications with the vehicle will more likely be necessary on weekends, and specify a relatively long standby and/or DRx period for days of the weekend, while specifying a relatively short standby and/or DRx period for weekdays. In another exemplary implementation, the user can provide standby and/or DRx schedule information in terms of an amount of power consumed. For example, the user can indicate that not more than forty percent of the vehicle's current battery charge should be consumed by the standby and/or DRx period, and further allocate specific percentages to each of the standby and DRx periods. In this exemplary implementation, the user can also specify different amounts of power consumptions for different situations. In yet another example, the user can indicate a number of DRx cycles for the DRx period. For example, if on weekdays the user merely drives to work parks for eight hours, and then returns home to park overnight, for those days the user could simply specify that there be no standby period and specify that the telematics unit run five short DRx cycles (Since the user is not expecting that he or she will need to access the vehicle wirelessly on those days).

After standby and/or DRx schedule information is received at stage 301, the information is actually put to use after the vehicle ignition is turned off at stage 303. If there is more than one possible standby and/or DRx schedule (i.e., when the user has input multiple schedules for different situations), the telematics unit determines the applicable standby and/or DRx schedule that should be used under the current circumstances at stage 305. For example, in one of the examples given above, the telematics unit could determine that the current day is a Saturday, and apply a weekend schedule rather than a weekday schedule based on the standby and/or DRx schedule information that was input by the user.

After the applicable schedule is determined at stage 305, the standby and/or DRx periods are executed by the telematics unit according to the applicable schedule at stage 307. It will be appreciated that, during the execution of the standby and/or DRx periods, the process 300 can be interrupted by the vehicle ignition being turned on (or some other interruption such as receiving a command from the user wirelessly to completely power down the vehicle). In such a situation, the process 300 restarts from stage 303 the next time the telematics unit determines that the vehicle ignition is powered off (switching from an on state to an off state). User input of standby and/or DRx schedule information at stage 301 can occur at any time, and the standby and/or DRx schedule information stored in the telematics unit is updated whenever new user input is received.

Figure 4:
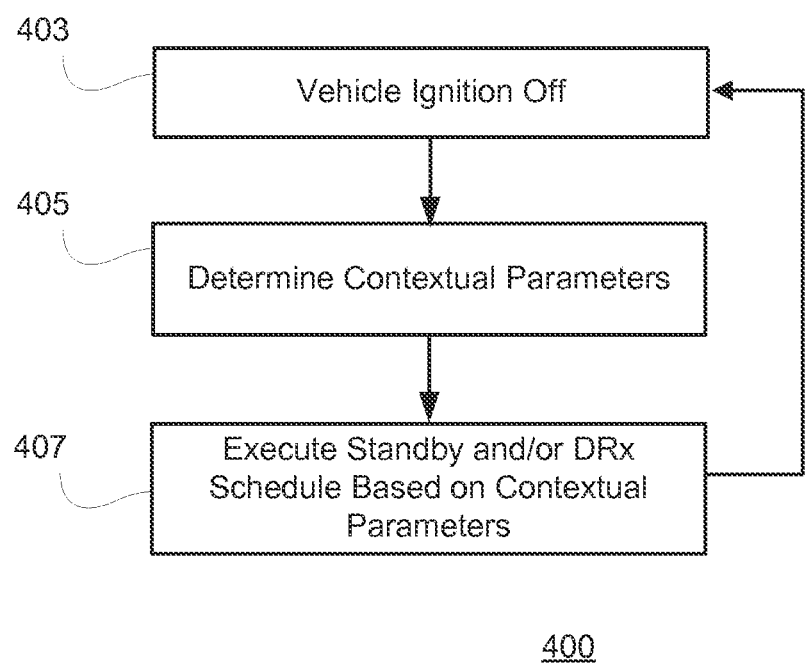
FIG. 4 is a flowchart illustrating an exemplary process for executing a context-adjustable standby and/or DRx schedule according to an implementation.

FIG. 4 depicts a process 400 for context-based adjustment of standby and/or DRx periods for a telematics-equipped vehicle based on contextual rules provided to the telematics unit. These contextual rules may be pre-programmed into the telematics unit, or, in a further implementation, may be provided to the telematics unit by a user. At stage 403, the vehicle ignition is turned off, and afterwards, at stage 405, the telematics unit determines contextual parameters, which are used at stage 407 for the execution of a standby and/or DRx schedule based on the contextual parameters.

Contextual parameters may include the drive cycle, the time of day, the day of the week, the current battery charge level, the location of the vehicle, and other information that is relevant to a determination of how long standby and/or DRx schedules should be executed for the vehicle. For example, if the vehicle is entering the vehicle ignition off state at stage 403 after being driven for a short period of time, short standby and/or DRx periods may be executed at stage 407 because the short drive cycle would not have had much time to charge the vehicle battery. Alternately, the telematics unit, via vehicle diagnostic hardware, could determine that the vehicle battery has a low charge level at stage 405 and execute short standby and/or DRx periods at stage 407 accordingly. Conversely, if the vehicle battery has a high charge level, a long standby and/or DRx period could be executed at stage 407. In another example, the telematics unit could determine at stage 405 that the vehicle is at a home location, and accordingly execute short standby and/or DRx periods, whereas if the vehicle is at a location away from home, relatively longer standby and/or DRx periods could be executed (based on a presumption that a user is more likely to need to wirelessly communicate with the vehicle when away from home).

It will be appreciated that multiple contextual parameters can be considered to provide flexible, optimized standby and DRx scheduling for a vehicle. For example, baseline standby and DRx time could be provided for certain days of the week, and adjusted upwards or downwards based on time of day, location, drive cycle, battery charge, etc. Optimal standby and DRx scheduling rules could be maintained by a TSP provider based on aggregated user vehicle data, and could be regularly updated to provide users of telematics vehicles with context-adjusted and power-efficient standby and DRx schedules for their vehicles.

Moreover, it will be appreciated that in further implementations, user customization can be combined with context-adjustment rules provided by the TSP to provide users with the ability to utilize the TSP's optimized scheduling rules in conjunction with the user's own preferences. For example, in one implementation, the user could pick and choose a few, some, or all of the contextual rules provided by the TSP, and then further add their own customizations. In one particular example, a user may generally like a pre-programmed contextual rule that the standby and/or DRx periods are relatively short on weekdays, but may also prefer that for Friday evenings, when the user is likely to be away from home, that the standby and/or DRx periods be relatively longer so that the user has access to his or her vehicle. Thus, the user can choose to accept the pre-programmed contextual rule generally, and add a custom user-selected standby and DRx schedule to keep the vehicle available longer on Friday evenings.

It will thus be appreciated that the described system and method allows for user customization and context-based adjustment of standby and/or DRx scheduling for a telematics-equipped vehicle. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for user customization of a discontinuous reception (DRx) schedule for a telematics-equipped vehicle, the method comprising:
   receiving, by a telematics unit of the vehicle, user input of DRx schedule information;
   determining, by the telematics unit, that ignition of the vehicle has been switched off;
   determining, by the telematics unit, an applicable DRx schedule from a plurality of DRx schedules, wherein the plurality of DRx schedules are based on the user input DRx schedule information; and
   executing, by the telematics unit, the applicable DRx schedule.

2. The method of claim 1, wherein the DRx schedule information comprises a number of DRx cycles to execute.

3. The method of claim 1, wherein the DRx schedule information comprises a length of time for a DRx period.

4. The method of claim 1, wherein the DRx schedule information comprises an amount of battery charge to be consumed.

5. The method of claim 1, wherein the plurality of DRx schedules include different DRx schedules based on day of the week.

6. The method of claim 1, wherein the plurality of DRx schedules include different DRx schedules based on vehicle location.

7. The method of claim 1, further comprising:
   before executing the applicable DRx schedule, adjusting the applicable DRx schedule based on a contextual parameter.

8. The method of claim 7, wherein the contextual parameter is a drive cycle of the vehicle.

9. The method of claim 7, wherein the contextual parameter is vehicle location.

10. The method of claim 7, wherein the contextual parameter is a time of day or day of the week.

11. A method for context-based adjustment of discontinuous reception (DRx) behavior for a telematics-equipped vehicle, the method comprising:
    receiving, by a telematics unit of the vehicle, input of a plurality of contextual rules provided to the telematics unit for the context-based adjustment of DRx behavior for the vehicle, wherein receiving the input of the plurality of contextual rules comprises the plurality of contextual rules being pre-programmed into the telematics unit or being provided to the telematics unit by a user;
    determining, by the telematics unit, that ignition of the vehicle has been switched off;
    determining, by the telematics unit, contextual parameters relating to a current context for the vehicle;
    determining, by the telematics unit, a DRx schedule from a plurality of DRx schedules based on the determined contextual parameters and the plurality of contextual rules, wherein different DRx schedules of the plurality of DRx schedules correspond to different contextual parameters according to the plurality of contextual rules; and
    executing, by the telematics unit, the determined DRx schedule.

12. The method of claim 11, wherein the contextual parameters include a drive cycle of the vehicle.

13. The method of claim 11, wherein the contextual parameters include vehicle location.

14. The method of claim 11, wherein the contextual parameters include a time of day or day of the week.

15. A non-transitory computer-readable medium, part of a telematics unit, with processor-executable instructions stored thereon for user customization of a discontinuous reception (DRx) schedule for a telematics-equipped vehicle, the processor-executable instructions, when executed by a processor, causing the following steps to be performed:
    receiving user input of DRx schedule information;
    determining that ignition of the vehicle has been switched off;
    determining an applicable DRx schedule from a plurality of DRx schedules, wherein the plurality of DRx schedules are based on the user input DRx schedule information; and
    executing, by the telematics unit, the applicable DRx schedule.

16. The non-transitory computer-readable medium of claim 15, wherein the processor-executable instructions further cause the following step to be performed:
    before executing the applicable DRx schedule, adjusting the applicable DRx schedule based on a contextual parameter.

* * * * *